United States Patent
Woodruff et al.

[11] Patent Number: 5,875,289
[45] Date of Patent: Feb. 23, 1999

[54] METHOD AND SYSTEM FOR SIMULATING AUTO-INIT MODE DMA DATA TRANSFERS

[75] Inventors: Bryan Alan Woodruff, North Bend; Ralph A. Lipe, Clyde Hill, both of Wash.

[73] Assignee: Microsoft Corporation, Redmond, Wash.

[21] Appl. No.: 671,770

[22] Filed: Jun. 28, 1996

[51] Int. Cl.$^6$ .............................. G06F 13/12; G06F 13/14
[52] U.S. Cl. .............. 395/182.07; 395/309; 395/182.07; 395/704
[58] Field of Search ............................ 711/207; 395/704, 395/182.07, 309, 888

[56] References Cited

U.S. PATENT DOCUMENTS

| | | | |
|---|---|---|---|
| 5,263,140 | 11/1993 | Riodan | 395/400 |
| 5,463,764 | 10/1995 | Muller | 395/182.13 |
| 5,668,957 | 9/1997 | Davis | 395/309 |
| 5,701,486 | 12/1997 | Gilbertsen | 395/704 |
| 5,715,477 | 2/1998 | Kikinis | 395/888 |

OTHER PUBLICATIONS

IBM Technical Disclosure Bulletin vol. 37, No. 8, page number 375–377, Uninterrupted Multiple Bus Cycle Transfer Mechanisim for Computer Systems, Aug. 1994.

*Primary Examiner*—Curtis A. Kuntz
*Assistant Examiner*—Hassen A. Mia
*Attorney, Agent, or Firm*—Jones & Askew

[57] ABSTRACT

A method and system for simulating auto-init DMA transfers to peripheral devices that do not support system DMA. To simulate auto-init mode DMA, a device driver monitors and responds to activity on the DMA channel when the application program specifies auto-init mode DMA. Data in a buffer is transferred to the peripheral device in small amounts called bursts. Several bursts comprise a block, and the end of each block must coincide with the end of a burst. When a burst is transferred from the buffer to the peripheral device, the peripheral device generates a physical interrupt. The device driver intercepts the physical interrupt and sends a virtual interrupt to the application program only when the physical interrupt is received for a burst that ends at the end of a block. In this manner, the application program is informed that it can again write data into the buffer for subsequent transfer to the peripheral device.

40 Claims, 4 Drawing Sheets

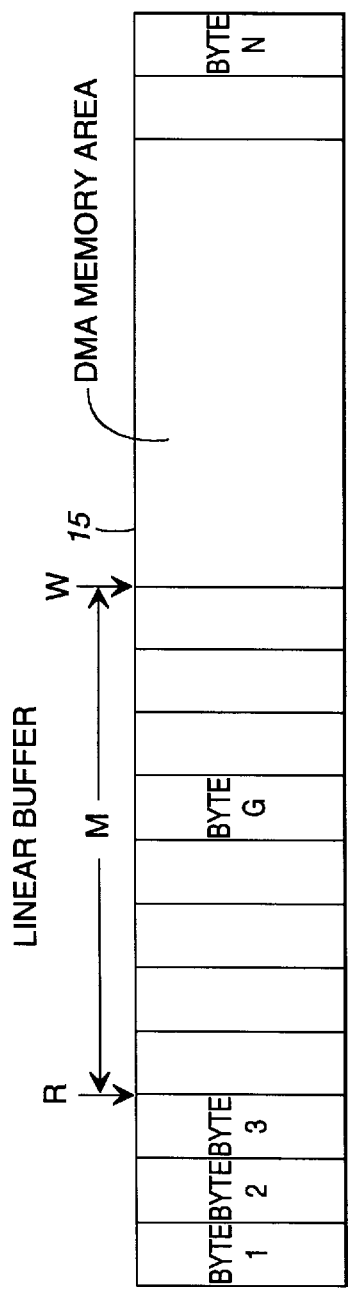
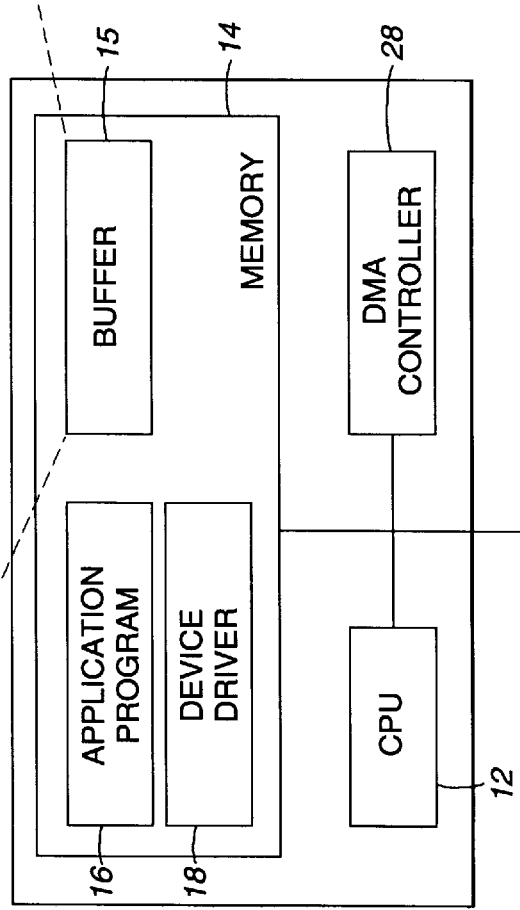
FIG. 2
FIG. 1

METHOD AND SYSTEM FOR SIMULATING AUTO-INIT MODE DMA DATA TRANSFERS

TECHNICAL FIELD

The present invention relates generally to a method and system for transferring data from an application program to a hardware device, and more specifically, to a method and system for simulating an auto-init mode DMA data transfer to a hardware device that does not support system DMA.

BACKGROUND OF THE INVENTION

Computer application programs, such as computer games, frequently include sophisticated audio that is transmitted to the user along with accompanying video. As anyone who has ever played a computer game realizes, these sound effects can range from beeps, bells, and whistles to elaborate sound patterns and sophisticated audio sequences.

The most effective audio effects are those that are perfectly synchronized with the corresponding video effect associated with the audio. For example, if the user of a computer game commands the application program to shoot a gun, the sound of the gunshot should be synchronized with the video display of the gunshot. Because the sequence of video and corresponding audio effects of computer games is necessarily unpredictable, due to user input, the problem of transmitting a particular piece of audio when other audio is being transmitted may pose a synchronization problem with certain computer systems.

Microprocessors in computer systems operate in multiple modes. Real mode is the default operating mode in certain computers based on the Intel 80×86 family of microprocessors and is the only operating mode supported by MS-DOS. Real mode refers to the microprocessor and the way it handles memory, but it can be characterized as providing the user with a single-tasking working environment in which programs can freely access system memory and input/output devices. Unlike the more versatile protected mode, real mode does not offer features for memory management and memory protection. When started in protected mode, these microprocessors provide hardware support for multitasking, data security, and virtual memory. Protected mode is an operating mode of certain microprocessors that supports larger address spaces and more advanced features than real mode.

Many computer systems and audio hardware devices support direct memory access (DMA). DMA involves the transfer of data without involving the microprocessor of a computer system. DMA is frequently employed for data transfer directly between the memory of a computer system and a peripheral device. However, not all peripheral devices support DMA.

DMA allows a peripheral device to directly access predetermined memory locations to retrieve or write data as necessary without participation by the CPU, with the exception of the CPU enabling interrupts, adjusting priorities, providing the address in the memory buffer where the data is located, and providing the number of bytes to be transferred. Thus, DMA allows a computer system to transfer information directly between the memory of the computer and an input/output (I/O) channel rather than taking the longer and more circuitous route from the memory to the microprocessor and then to the I/O channel.

The DMA controller controls the transfer of data through the bus from the memory to the audio hardware. The DMA controller also arbitrates access to the bus to transfer data to the audio hardware device that acknowledges signals on the DMA channel. The DMA controller transfers data through requests and acknowledgments on the bus. "System DMA" refers to computer systems in which the embedded DMA controller can control access to the audio hardware device.

Application programs designed to run on systems that support DMA are also designed to program the DMA controller to transfer data at specific locations in the RAM buffer in the computer system memory. Therefore, application programs for use in such computer systems expect the audio hardware devices connected to the system to support DMA and consequently expect DMA controller operations to exist.

Some audio hardware devices to which audio data is transferred support DMA transfers. However, some devices, such as PCMCIA-type and PCI-type audio devices, do not support system DMA because the DMA controller is not connected to the PCMCIA slot or the PCI slot in which the cards are positioned.

PCMCIA (acronym for Personal Computer Memory Card International Association) is a common standard for peripheral cards and the slot designed to hold them. PCMCIA cards typically are add-in cards that fit within predetermined slots to increase the amount of memory in a system. However, PCMCIA devices may also be dedicated cards for performing a specified function, such as a sound card.

PCI (acronym for Peripheral Component Interconnect) type audio devices are designed for operation in connection with a PCI local bus system. PCI is a specification that defines a local bus system for a computer built to the PCI specification.

Many application programs are written such that data is transferred to an audio hardware device using DMA because the application programs assume that the computer system is designed in accordance with ISA architecture. For audio peripherals based on PCI or PCMCIA standards, system DMA is not supported for the transfer of audio from the application program.

The DMA controller operates in one of two modes. One mode, called the "single cycle" mode, allows the application to program the DMA controller to transfer a specific number of bytes. When the DMA transfer reaches terminal count, i.e., the specified number of bytes have been transferred, the DMA transfer terminates. For subsequent data transfers, the application program must reprogram the DMA controller to transfer the new, predetermined number of bytes, of data.

Thus, in single cycle mode, the application commands the DMA controller to make a single transfer of a specified number of bytes of data beginning at a specified location in the buffer.

In "auto-init" mode, the DMA controller does not have to be reprogrammed to transfer data once the predetermined number of bytes have been transferred from the buffer. In auto-init mode, the DMA controller transfers data beginning at a specified memory location in the buffer. When the data has been transferred, subsequent bytes of data are automatically transferred beginning at the same memory location in the memory. Thus, in auto-init mode, the transfer of data from the buffer is effectively a circular buffer, with data filling the buffer, being transferred, and subsequent data filling the same locations in the buffer for transfer. The transfer of data in this manner continues until the application program commands the DMA controller to terminate the transfer of data.

A current implementation of an auto-init mode DMA transfer is shown in FIG. 1. The computer system, generally shown at 10, includes a CPU 12, a memory 14 including an application program 16 and a device driver 18, a bus 20, a DMA controller 28, and a peripheral device 22. In accordance with the preferred embodiment of the present invention, the peripheral device 22 is a sound card. Peripheral devices that support DMA transfers include a clock 24 and DMA logic 26. As shown in FIG. 1, the sound card is connected to a speaker 30 for transmitting sounds in accordance with the data stored in memory.

A predetermined portion of memory includes buffer 15, which is allocated for DMA transfers. Buffer 15 is a linear buffer and can also be called the DMA memory area. In FIG. 2, the data stored in the DMA memory area is shown as ranging from Byte 1 to Byte N. In accordance with the preferred embodiment of the present invention, it should be understood by those skilled in the art that each byte consists of digitized audio data.

A write pointer W and a read pointer R are associated with the buffer 15. The write pointer W determines where the application program writes data into the buffer. The read pointer R determines where the sound card reads data directly from the buffer during a DMA transfer. The write pointer W and read pointer R are separated by a predetermined number of bytes M. This separation is required such that data is not read out of the buffer from a certain location in the buffer prior to data being written into that location. Thus, the read pointer R can be thought of as "chasing" the write pointer W, yet read pointer R is always offset from write pointer W by at least M bytes. The device driver 18 maintains the positions of the pointers such that the application program knows what memory address within the buffer at which to write data and the sound card knows what memory address within the buffer at which to read data.

When the application program has written Byte N into the buffer, the application program then begins writing data again at Byte 1 and the write pointer W is reset to point to Byte 1. In this manner, the DMA memory area is analogous to a circular buffer.

In auto-init mode, a predetermined number of bytes of data are transferred from the buffer to the sound card. Thus, beginning at a memory address identified by the read pointer R, a predetermined number of bytes are transferred to the sound card. A transfer counter is updated by the DMA controller for each data transaction and when the transfer of the predetermined number of bytes is complete, an interrupt is generated by the sound card.

Assume data has been written into a memory location in the buffer, e.g., at Byte G, but has not yet been read. If the application program determines that additional data should be written into the location filled by Byte G, the application program can obtain the position of the pointers. The position of the read pointer R is important to the application program because it allows the application program to determine what data is currently being transferred to the sound card. When the application program wants to write a new sound into the buffer, e.g., to insert a gunshot sound in response to a user's input during a computer game, the application program determines where to insert the new sound by determining the position of the read pointer. The application program knows at what time the new sound should be inserted and therefore, the application moves an appropriate number of bytes forward in the DMA buffer from the read pointer R to insert the new sound. In FIG. 2, the new sound is added at Byte G. The new sound is written to the memory address of Byte G where the new sound is digitally added to the data already present in the memory location. In this manner, by obtaining the position of read pointer R, the application program can add new data to the buffer.

For peripherals that do not support DMA transfers, current operating systems provide a method simulating a DMA transfer. However, current systems only simulate a single cycle mode DMA transfer. In a single cycle DMA transfer, the application program writes data into the buffer and then the entire contents of the buffer is transferred to the sound card. In FIG. 2, Bytes 1-N are transferred in one operation from the DMA buffer to the sound card.

At an application program-determined interval (e.g., a counter set to a specific number of samples transferred to the sound card), the sound card generates an interrupt request. The interrupt is a notification that the interval has been reached and the sound card is ready for new data.

Thus, it should be appreciated that when a new sound is to be inserted into the buffer, the application program waits for the contents of the buffer to be transferred before a new sound is added. This waiting requires a time delay that may cause the new sound to be added to the buffer at a later time such that the new sound is not synchronized with a corresponding video display of the action that creates the new sound.

Current operating systems include virtual device drivers that simulate DMA transfers for hardware that does not support system DMA by using single cycle transfers. Single cycle transfers are those transfers in which the application program configures the buffer, and unmasks the DMA channel for a single transfer of a specified number of bytes. The virtual device driver translates this operation to a simple memory transfer from the buffer to the hardware.

MS-DOS applications do not rely on the operating system to control sound hardware. Instead, MS-DOS applications include their own set of drivers for various audio hardware platforms. Effectively, the application program communicates directly with the audio hardware to control sounds. The application assumes that the audio hardware supports a system DMA channel to transfer data from the application to the audio hardware.

By requesting auto-init mode DMA, the application program requests that the transfer of data be cycled by using the same memory location within the buffer until the application masks (or stops) the DMA transfer. The application determines the current location of the transfer by querying the DMA channel status and copies the data for the audio slightly ahead of the current transfer location.

When a system is simulating only single cycle DMA mode, an application program may request auto-init mode DMA transfers. In this case, most sound data will not be transferred because the application expects continuous cycling of the data in the buffer yet the system only supports the transfer of a specified number of bytes from the buffer.

The single cycle approach to simulating DMA transfers has drawbacks. Application programs expect data to be transferred at a steady rate. The contents of the buffer are not expected to change, i.e., no new data can replace data in the buffer until the contents of the buffer have been transferred to the audio hardware device. Therefore, if a new sound occurs after the buffer has been filled, that sound must wait until the contents of the buffer have been transferred to the audio hardware device until the new sound can be put in the buffer and transferred. Thus, the transfer of the new sound is delayed for the amount of time it takes to transfer data from the buffer to the audio hardware device. Therefore, the driver must transfer a specified block of data in the buffer and the data cannot be broken to insert new data for transfer.

Thus, an application program, when transferring data, looks for the DMA controller and assumes the DMA controller supports auto-init mode. The application expects the DMA controller to transfer data from the current device position which may include new data since the start of the transfer request, but the simulated DMA controller has already copied the buffer to transfer a discrete number of bytes from the buffer to the sound card. Therefore, when the application wants to modify the data to insert a new sound in the middle of the data in the buffer and the data has already been transferred out of the buffer, the modification is delayed or gets overwritten.

Current operating systems do not generate notification, in the form of a callback, when the application program queries the device driver to insert a new sound into the buffer. The application program queries the device driver for the memory location in the buffer at which the current transfer of data is taking place. Thus, because the operating system does not generate notification of this query, the device driver cannot report a DMA status to the application program to properly simulate the action of the actual DMA controller. Therefore, the new sound is delayed and inserted in the buffer after the current contents of the buffer have been transferred.

Thus, current device drivers are unable to configure the system to allow the application program to assume it is operating in auto-init mode.

Current software translation layers assume that the audio hardware supports a physical system DMA channel such that the default behavior of the hardware handles the physical data transfer submitted by the application. However, audio hardware devices that do not support system DMA lack this level of compatibility. Thus, there is a need for a method that allows backwards compatibility of application programs designed for systems that support auto-init DMA for use in connection with systems that do not support DMA.

SUMMARY OF THE INVENTION

The present invention provides techniques implemented in an operating system to simulate auto-init DMA transfers. These techniques allow transfers from a physical memory to a peripheral device when the peripheral device lacks support for system DMA. Two common implementations of such physical devices that exist today are PCMCIA-type and PCI-type audio devices.

To simulate auto-init mode DMA, the device driver monitors and responds to activity on the DMA channel when the application program specifies auto-init mode DMA. The device driver determines characteristics of the DMA transfer to successfully simulate the auto-init mode transfer.

When a device uses a buffered data transfer such as a PCMCIA card, the device driver maintains a physical read pointer and a virtual read pointer for the data stored in the buffer, also called the DMA memory area. A device driver maintains the positions of these pointers. Data, written to the buffer by the application program, is transferred to the peripheral device in small amounts called bursts. At least one, but preferably several, bursts comprise a block. The end of each block must coincide with the end of a burst. The physical read pointer maintains the position of the burst being transferred. The virtual read pointer maintains the position at the end of the block.

When a burst is transferred from the buffer to the peripheral device, the peripheral device generates a physical interrupt. The device driver intercepts the physical interrupt. The device driver sends an interrupt to the application program only when the physical interrupt is received for a burst that ends at the end of a block. The interrupt that the device driver sends to the application program is called a virtual interrupt. The virtual interrupt is issued to the application program at the frequency at which the application is expecting interrupts. In this manner, the application program is informed that the data transfer from the current buffer to the peripheral device has been completed. Some application programs use this interrupt for sequencing animation and/or music.

To implement the present invention, the device driver utilizes several system extensions. These extensions enable callbacks, which inform the device driver of application program DMA status requests.

BRIEF DESCRIPTION OF THE DRAWINGS

FIG. 1 is a diagram of a system using the auto-init method of DMA data transfers.

FIG. 2 is a diagram of a portion of memory allocated for storing data for DMA transfers.

DETAILED DESCRIPTION OF THE PREFERRED EMBODIMENT

Figure 3:
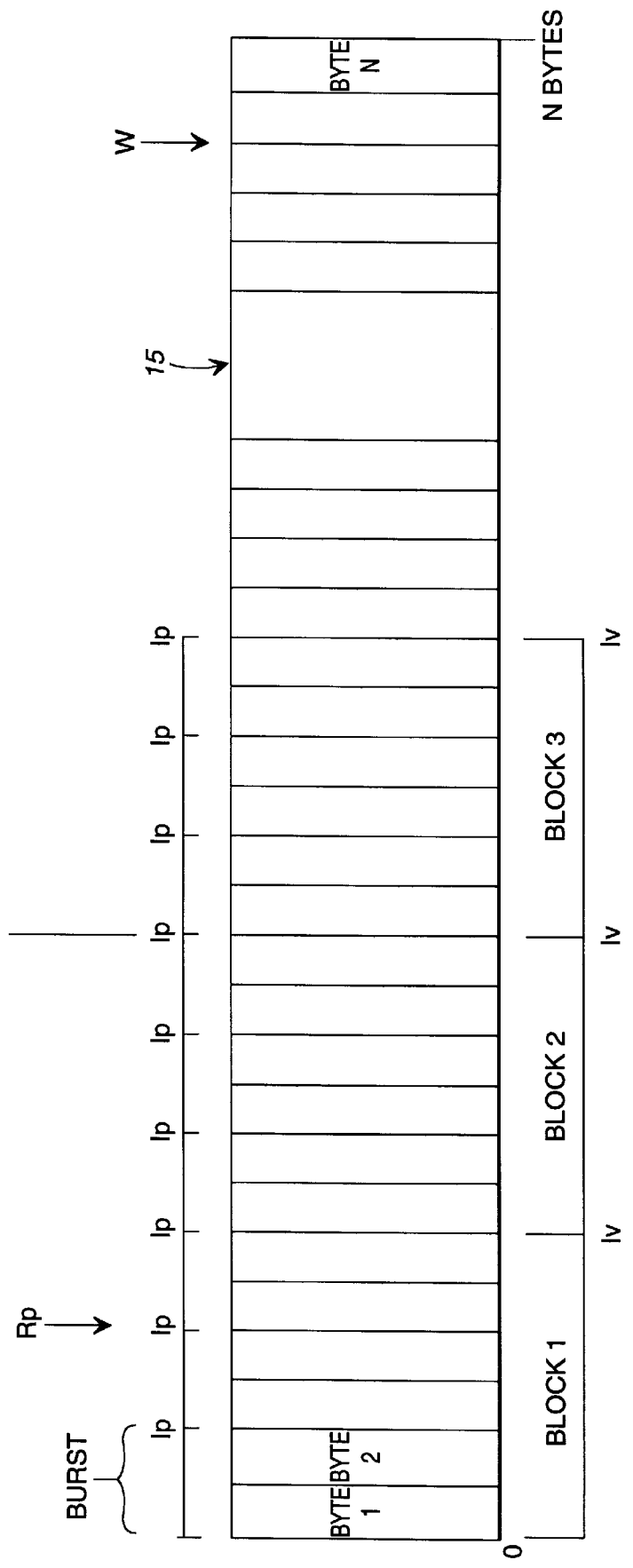
FIG. 3 is a representation of a portion of memory for storing data for auto-init simulation, in accordance with the present invention.

Turning next to the figures, the preferred embodiment will now be described in detail. The present invention is directed to a method and system for simulating an auto-init mode data transfer from an application program to a peripheral device such as a sound card. Although the preferred embodiment of the present invention will be described below, in part, with respect to a specific application program, those skilled in the art will recognize that the present invention may be utilized in connection with other application programs.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to convey most effectively teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

Although the preferred embodiment will be generally described in connection with an application program, those skilled in the art will recognize that the present invention also can be used in connection with any form of programming, including program modules, such as application programs and operating systems, that transfer sound to an audio hardware device.

The simulation of an auto-init DMA data transfer is best described with reference to FIG. 3. FIG. 3 shows the DMA memory area as a linear buffer 15 in the memory 14 of the computer. The application program writes data into the DMA memory area, or DMA buffer, to be subsequently transferred to the sound card. The device driver traps the command from the application program to transfer data to the sound card. In accordance with the present invention, the device driver determines the current memory location in the buffer at which data is being transferred.

In accordance with the present invention, the device driver includes a program module that monitors application program interaction with the peripheral device. When the application program attempts to query the DMA controller, new callbacks are provided by the operating system because no DMA controller exists on peripheral devices that do not support system DMA. The new system extensions are provided to notify the device driver that the application is attempting to query the status of a DMA data transfer or initiate a new DMA data transfer.

In accordance with the present invention, the device driver requests extended callbacks for a particular DMA channel. If extended callbacks are enabled, the device driver is notified of activity on the DMA channel, in addition to the standard callbacks received under prior operating systems. The new functions are:

VDMAD_Set_Channel_Callbacks. This function enables or disables extended callbacks for the DMA channel.

VDMAD_Set_Virt_Count. This function sets the virtual DMA counter value, i.e., the virtual read pointer, for the given DMA channel.

VDMAD_Get_Virt_Count. This function returns the memory location in the buffer corresponding to the virtual read pointer.

The application writes a "block size" value to a counter in the audio device. A block size of data is the interval required to transfer the data to the peripheral device from the DMA buffer. When this transfer interval is reached, the application program receives an interrupt from the device driver so that the application can write additional data into the buffer or perform other tasks such as sequencing animation and/or music. Therefore, it can be said that the block size determines the interrupt frequency to the application. In accordance with the present invention, the interrupt generated at the interrupt frequency to the application is called the "virtual interrupt". It is seen in FIG. 3 that a virtual interrupt, identified as Iv, is generated when each block size of data has been transferred from the DMA buffer to the sound card. Thus, in FIG. 3, a virtual interrupt is generated at the end of Block 1, Block 2, and Block 3, and so forth for each block in the DMA buffer.

The sound card transfers data at a predetermined speed. The sound card includes a clock, and at every predetermined time increment determined by the clock, the sound card will transfer data. When each data block transfer is completed, the sound card issues an interrupt to the application program that tells the application program that the transfer is complete and that the sound card is ready to transfer additional data. However, in accordance with the present invention, the device drive intercepts the interrupt.

The sound card reads data from the DMA buffer in amounts less than a block size. The sound card transfers data from the DMA buffer in amounts called a "burst size". In the example of FIG. 3, three burst sizes of data equals one block size of data.

The burst size is the size of data that the device driver uses to copy from the physical DMA buffer to the sound card. Additionally, it should be understood that a every block must end at the end of a burst, but every burst need not end at the end of a block. The device driver computes the burst size, i.e., at what rate the DMA buffer is to be sampled to transfer data to the sound card.

After a burst size of data is transferred from the DMA buffer to the sound card, the sound card generates an interrupt. In accordance with the present invention, this interrupt is called the "physical interrupt", identified in FIG. 3 as Ip. The physical interrupt, which is issued to the application program, is intercepted by the device driver. When the device driver determines that a burst has been transferred that ends at the end of a block, the driver generates a virtual interrupt to the application program. The device driver does not issue an interrupt each time it receives a physical interrupt from the sound card at the end of each burst. Only the virtual interrupt is sent to the application at the end of each burst that ends at the end of a block. In this manner, the application program only receives interrupts when a block of data has been transferred from the DMA buffer. Therefore, it should be understood that the interrupt frequency for the application is determined by the block size of data written by the application to the DMA buffer.

The application program has peripheral-specific information such that the application program expects to get an interrupt at a certain rate. Thus, the application program expects a certain application interrupt frequency and a certain rate at which the virtual read pointer Rv changes. If the application interrupt frequency, i.e., the virtual interrupt frequency, and the physical interrupt frequency differ, then the device driver services the physical interrupts and only dispatches virtual interrupts at the application's interrupt frequency. It should be understood that the virtual interrupt frequency and the physical interrupt frequency will differ when the burst size does not equal the block size. This effectively fools the application into believing that the data in the DMA buffer is being transferred at the application's frequency and the application will continue to fill the DMA buffer upon receiving a virtual interrupt. Therefore, the device driver tricks the application program into believing the sound card supports system DMA.

A virtual read pointer Rv is associated with the DMA buffer. When the application queries the device driver to determine the location at which to insert new data into the DMA buffer, the device driver uses the virtual read pointer Rv to give the memory location to the application program. A physical read pointer Rp identifies the memory location within the DMA buffer at which the sound card is actually reading data from the DMA buffer.

The virtual read pointer Rv and the physical read pointer Rp are offset by a predetermined number of bytes. This offset allows the application program to insert new sounds into the DMA buffer without having to wait for the entire contents of the buffer to be transferred. The application program believes that data is being transferred beginning at a memory location identified by Rv, yet the actual transfer of data is occurring at the memory location identified by Rp.

The device driver maintains the positions of the pointers in the DMA buffer. Thus, when a new sound is to be inserted, the application queries the device driver to obtain the position of virtual pointer Rv. The application then inserts the new data at an appropriate memory location after Rv.

Figure 4:
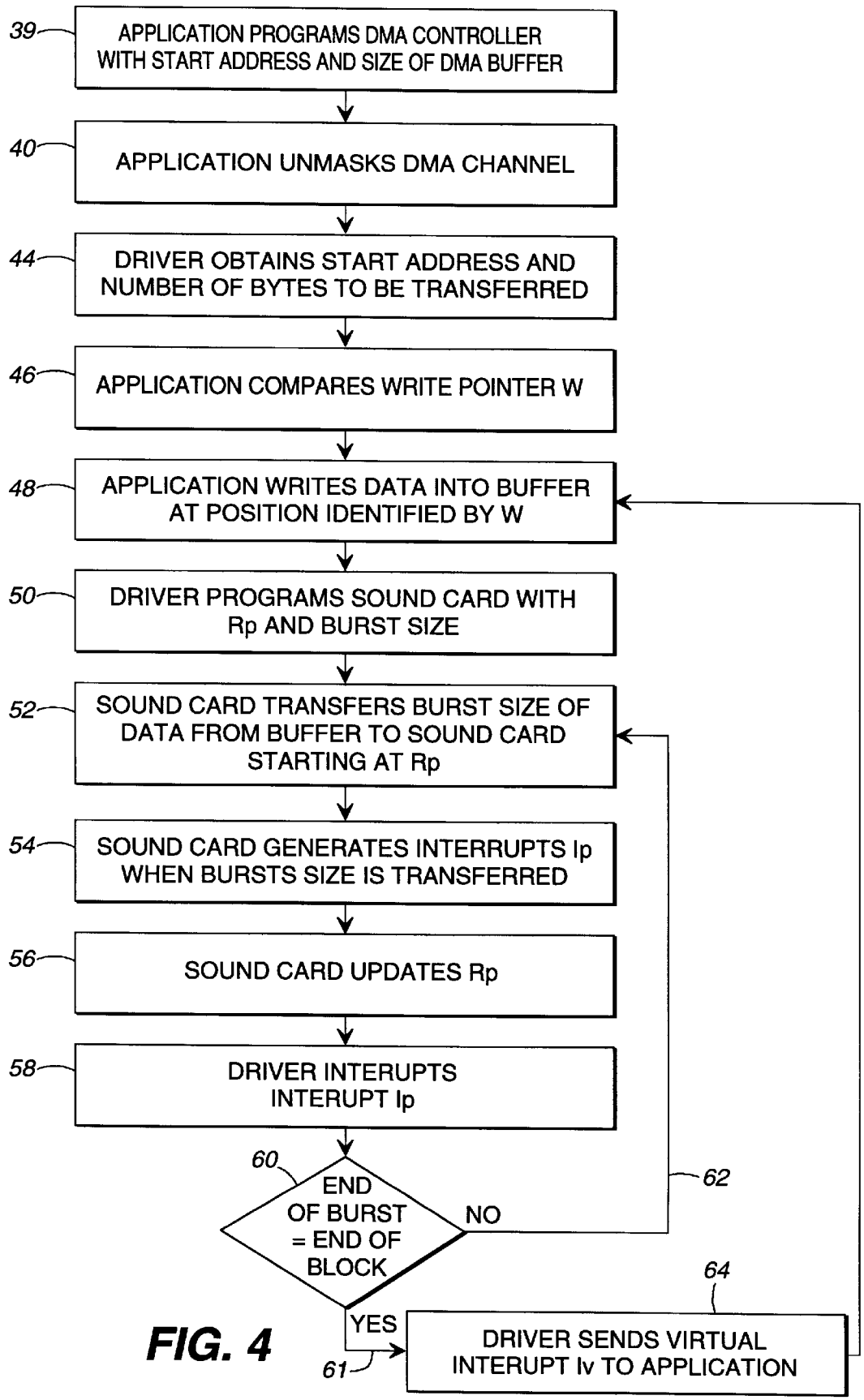
FIG. 4 is a flow chart of the steps performed by the application program and device driver in accordance with the present invention.

The method of implementing the simulation of auto-init DMA transfers is shown in the flowchart of FIG. 4. At step 39, the application program programs the DMA controller with the start address and the size in bytes of the DMA buffer. At step 40, the application program unmasks the DMA channel. The unmasking of the DMA channel includes enabling the physical and virtual interrupts.

At step 44, the device driver obtains the start address within the DMA buffer and the number of bytes to be transferred. The application then computes the location of write pointer W, at step 46, based on information supplied by the device driver. Thus, the application program knows the location within the DMA buffer at which to write the new data.

At step 48, the application program writes data into the DMA buffer beginning at the memory location identified by the write pointer W. When the data in the DMA buffer is to be transferred to the peripheral device, the device driver programs the sound card with the position of Rp and the burst size, at step 50. The sound card then transfers a burst size of data from the DMA buffer to the sound card starting at the memory location identified by the Rp pointer, at step 52. When the burst size of data has been transferred to the sound card, the sound card, at step 54, generates an interrupt. This interrupt, as discussed above, is called the physical interrupt, Ip. At step 56, the device driver updates the position of Rp by reading counters on the sound card or by computing the position based on the number of samples transferred per burst.

At step 58, the device driver intercepts the physical interrupt Ip generated by the sound card. At step 60, it is determined whether the end of the burst is located at the end of a block. If the end of the burst is located at the end of a block, the method follows "yes" branch 61 to step 64, where the device driver sends a virtual interrupt to the application program. The method then returns to step 48.

If the end of the burst is not located at the end of a block, the method follows "no" branch 62 and returns to step 52, where the sound card transfers another burst size of data from the DMA buffer.

Figure 5:
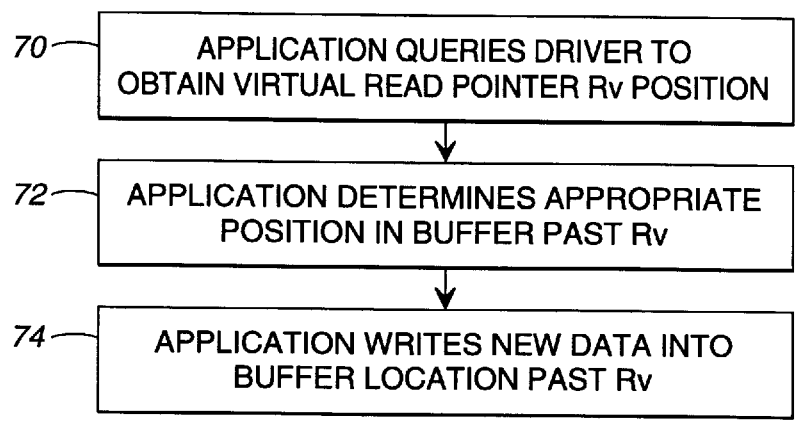
FIG. 5 is a flow chart of the steps performed in writing new data into the buffer in accordance with the present invention.

When new data is to be inserted into the DMA buffer in a memory location that has already been filled with data, the implementation of the preferred embodiment of the present invention is described in the flowchart of FIG. 5.

At step 70, the application program queries the device driver to obtain the position of the virtual read pointer Rv. At step 72, the application program, based on the time required for each memory location to be read and the time that the new data is to be read, determines the position in the DMA buffer where the new data is to be written. This position must be in a memory location after the virtual read pointer Rv. At step 74, the application program writes the new data into the appropriate memory location where the new digital data is digitally added to the data already existing in the memory location.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only be the claims below.

What is claimed is:

1. In association with a computer peripheral device, connected to a computer system, that does not support an auto-init DMA data transfer, a method of simulating the auto-init DMA data transfer comprising the steps of:

monitoring activity on a DMA channel of the computer system to determine when an application program issues a request for a new DMA data transfer;

transferring a block of data from the application program to a buffer in the computer system;

transferring a burst of data from the buffer to a memory of the peripheral device;

generating a physical interrupt when the burst of data is transferred;

intercepting the physical interrupt;

in response to intercepting the physical interrupt, generating a virtual interrupt to the application program when the end of the burst coincides with the end of the block;and in response to identifying the request from the application program for the new DMA data transfer, issuing a callback to the application program indicating a location in the buffer for the new DMA data transfer.

2. The method of claim 1 wherein said step of intercepting the physical interrupt is performed by a device driver associated with the peripheral device.

3. The method of claim 1 wherein said peripheral device is a sound card.

4. The method of claim 1 wherein said data is digital audio data.

5. The method of claim 1 wherein said buffer has a virtual read pointer for maintaining the location of the block of data in the buffer and a physical read pointer for maintaining the location of the burst in the buffer, and wherein said step of transferring the burst of data begins at the location maintained by the physical read pointer.

6. The method of claim 5 wherein said virtual read pointer and said physical read pointer are separated by a predetermined number of bytes.

7. The method of claim 1 wherein the end of the block of data coincides with the end of the burst of data.

8. The method of claim 1 wherein said step of generating a physical interrupt is performed by the peripheral device.

9. The method of claim 2 wherein said step of generating a virtual interrupt is performed by the device driver.

10. The method of claim 1 wherein said step of intercepting is performed by a device driver.

11. The method of claim 1 wherein a physical read pointer identifies a memory location in the buffer at which data is to be transferred to the peripheral device.

12. The method of claim 1 wherein a virtual read pointer identifies a memory location in the buffer from which the application program attempts to transfer data to the peripheral device.

13. The method of claim 12 wherein the location in the buffer for the new DMA data transfer is already filled with data.

14. The method of claim 13 wherein the location in the buffer for the new DMA data transfer is associated with the virtual read pointer.

15. A computer system, including a peripheral device connected to said computer system that does not support an auto-init DMA data transfer, said computer system operative to execute a program for simulating the auto-init DMA data transfer, comprising:

a processing device;

a memory, coupled to the processing device, for storing the program; and a device driver associated with said peripheral device;

the processing device, responsive to instructions from the program, operative to:

monitor activity on a DMA channel of the computer system to determine when an application program issues a request for a new DMA data transfer;

transfer a block of data from an application program to a buffer in the computer system;

transfer a burst of data from the buffer to the memory of a peripheral device;

generate a physical interrupt when the burst of data is transferred; and in response to identifying the request from the application program for the new DMA data transfer, issue a callback to the application program indicating a location in the buffer for the new DMA data transfer;

said device driver being operative to:

intercept said physical interrupt; and generate a virtual interrupt to said application program when the end of the burst coincides with the end of a block.

16. The system of claim 15 wherein said peripheral device is a sound card.

17. The system of claim 15 wherein said data is digital audio data.

18. The system of claim 15 wherein said buffer has a virtual read pointer for maintaining the location of the block of data in the buffer and a physical read pointer for maintaining the location of the burst of data in the buffer, and wherein the burst of data is transferred from the buffer to a memory of the peripheral device beginning at the location of the physical read pointer.

19. The system of claim 15 wherein said virtual read pointer and said physical read pointer are separated by a predetermined number of bytes.

20. The system of claim 15 wherein the end of each block coincides with the end of a burst.

21. The system of claim 15 wherein said peripheral device generates said physical interrupt.

22. The system of claim 15 wherein said device driver generates said virtual interrupt.

23. The system of claim 15 wherein a physical read pointer identifies a memory location in the buffer at which data is to be transferred from the buffer to the peripheral device.

24. The system of claim 15 wherein a virtual read pointer identifies a location in the buffer from which the application program attempts to transfer data to the peripheral device.

25. The system of claim 24 wherein the location in the buffer for the new DMA data transfer is already filled with data.

26. The system of claim 25 wherein the location in the buffer for the new DMA data transfer is associated with the virtual read pointer.

27. A computer-readable medium on which is stored a program module for simulating an auto-init DMA data transfer between a computer system and a computer peripheral device, connected to a computer, that does not support the auto-init DMA data transfer, the program module comprising instructions which, when executed by the computer, perform the steps of:

monitoring activity on a DMA channel of the computer system to determine when an application program issues a request for a new DMA data transfer;

transferring a block of data from the application program to a buffer in the computer;

transferring a burst of data from the buffer to a memory of the peripheral device;

generating a physical interrupt when the burst of data is transferred;

intercepting the physical interrupt;

in response to intercepting the physical interrupt, generating a virtual interrupt to the application program when the physical interrupt coincides with the end of the block;and in response to identifying the request from the application program for the new DMA data transfer, issuing a callback to the application program indicating a location in the buffer for the new DMA data transfer.

28. The medium of claim 27 wherein said step of intercepting the physical interrupt is performed by a device driver associated with the peripheral device.

29. The medium of claim 27 wherein said peripheral device is a sound card.

30. The medium of claim 27 wherein said data is digital audio data.

31. The medium of claim 27 wherein said buffer has a virtual read pointer for maintaining the location of the block of data in the buffer and a physical read pointer for maintaining the location of the burst of data in the buffer, and wherein said step of transferring the burst of data begins at the location maintained by the physical read pointer.

32. The medium of claim 31 wherein said virtual read pointer and said physical read pointer are separated by a predetermined number of bytes.

33. The medium of claim 27 wherein the end of the block of data coincides with the end of the burst of data.

34. The medium of claim 27 wherein said step of generating the physical interrupt is performed by the peripheral device.

35. The medium of claim 27 wherein said step of generating the virtual interrupt is performed by a device driver.

36. The medium of claim 27 wherein said step of intercepting is performed by a device driver.

37. The medium of claim 27 wherein a physical read pointer identifies a memory location in the buffer at which data is to be transferred to the peripheral device.

38. The medium of claim 27 wherein a virtual read pointer identifies a memory location in the buffer from which the application program attempts to transfer data to the peripheral device.

39. The medium of claim 38 wherein the location in the buffer for the new DMA data transfer is already filled with data.

40. The medium of claim 39 wherein the location in the buffer for the new DMA data transfer is associated with the virtual read pointer.

\* \* \* \* \*